United States Patent Office 3,397,508
Patented Aug. 20, 1968

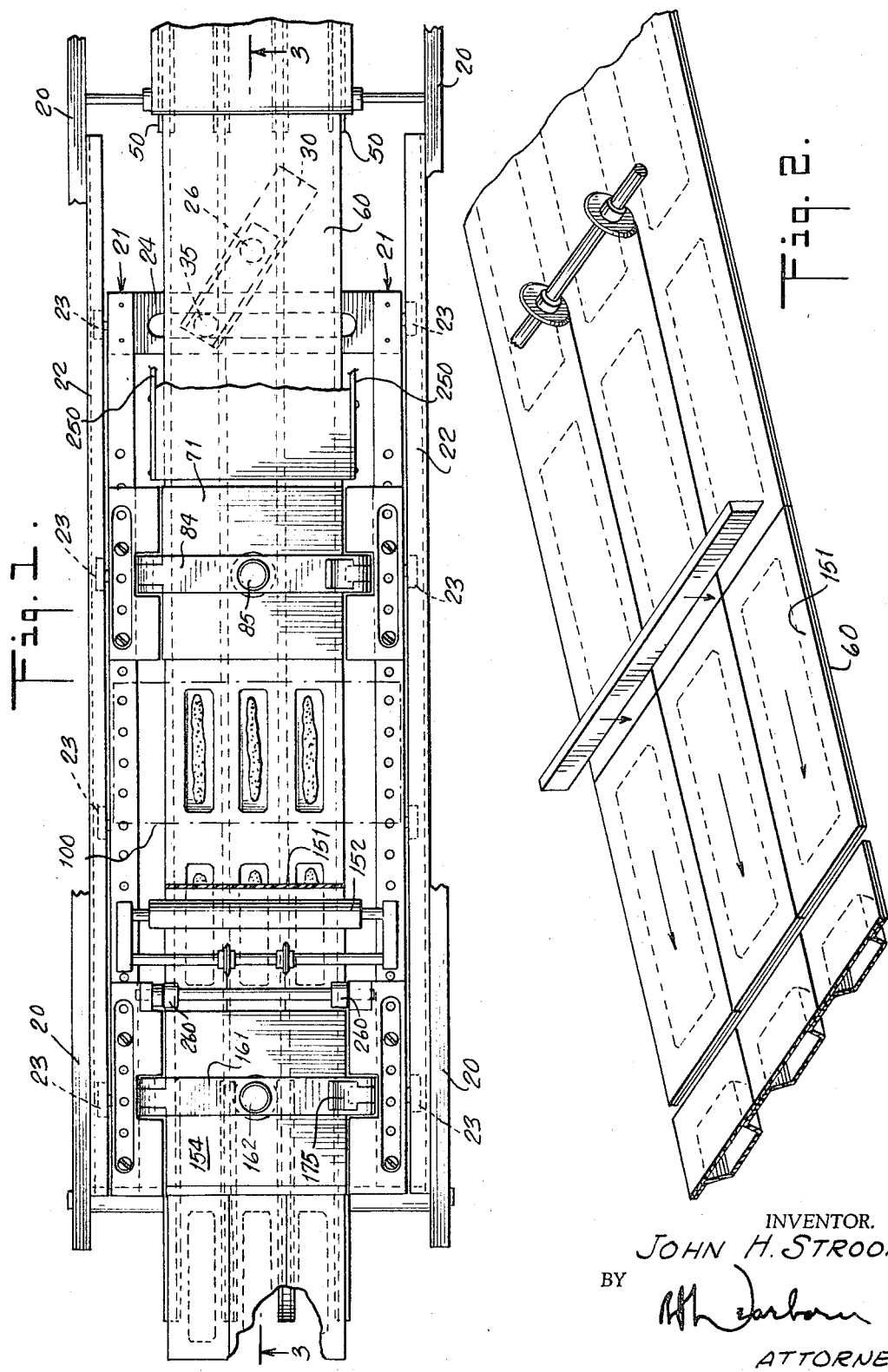

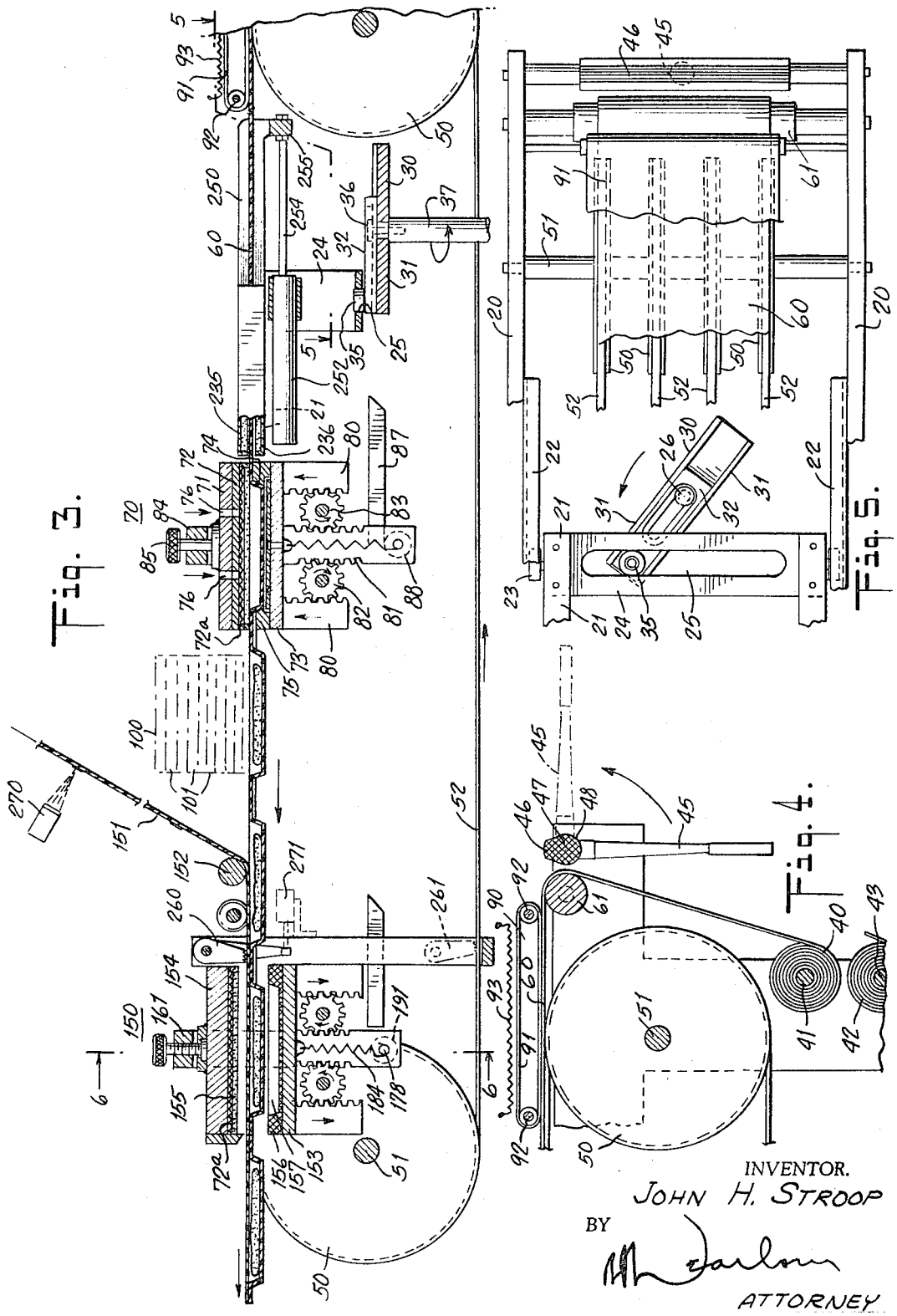

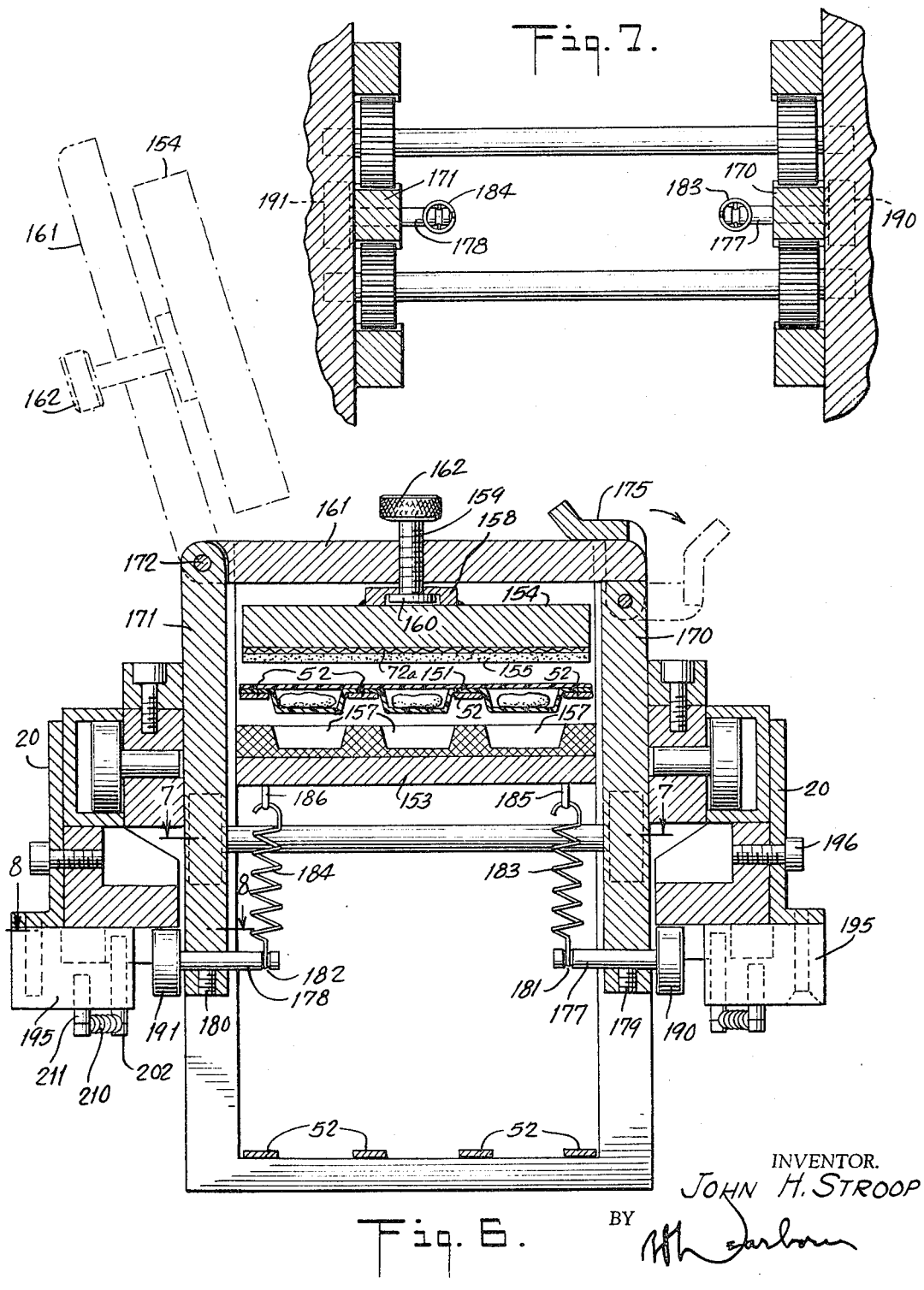

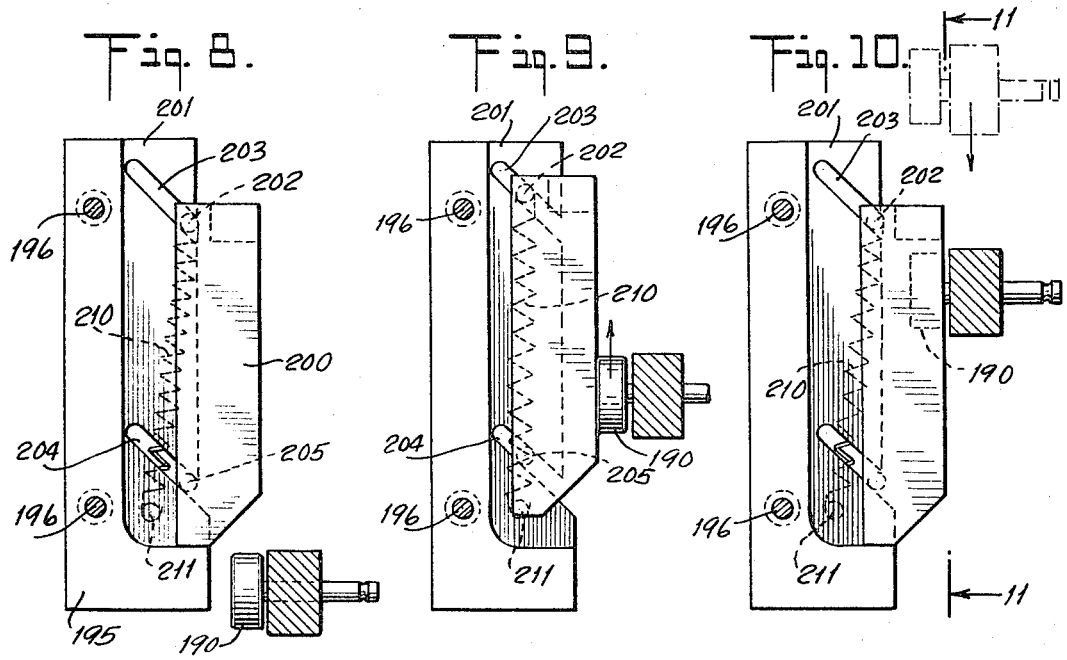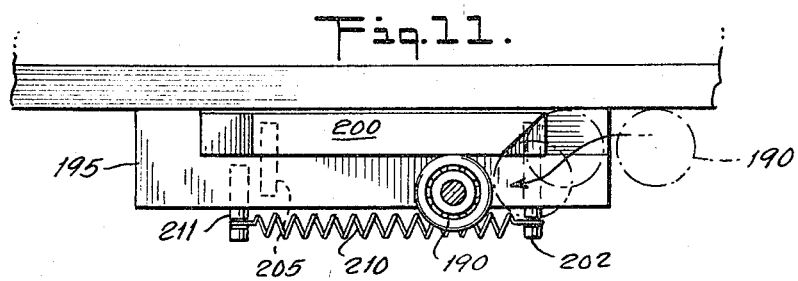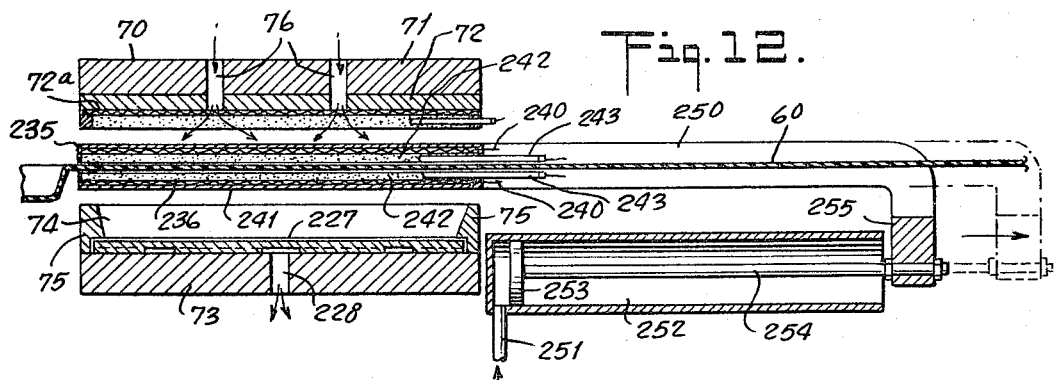

3,397,508
THERMOPLASTIC PACKAGING MACHINE
John H. Stroop, New York, N.Y., assignor, by mesne assignments, to Total Packaging Inc., New York, N.Y., a corporation of New York
Filed Aug. 6, 1965, Ser. No. 477,830
11 Claims. (Cl. 53—184)

ABSTRACT OF THE DISCLOSURE

A packaging machine to thermoform, fill and cover tray-type packages from plastic sheeting. The machine is based on a system of in-motion work-performing stations mounted in sequence on a crank-driven bed moving constantly forward and backward in a stationary frame. The moving work-stations are activated by cams which are a part of the stationary frame. The plastic sheeting being formed into packages moves continuously through the machine, resting freely on endless idler-mounted bands which are driven continuously forward by directionally acting pawls which are part of the work-stations. The continuous motion of both the work-stations and the work in progress shortens the cycle time for each package formed and produces a faster packaging machine.

---

This invention relates to machines for forming and filling thermoplastic webs.

One object of this invention is to provide a machine which will efficiently operate with a minimum of attention and will be capable of packaging the desired products per minute at many times the speed of prior art machines. For example, the machine of this invention can package small medicinal tablets at the rate of 12,000 per minute.

Another object is to incorporate a work station which moves on a moving bed at the same speed as the thermoplastic web while the web is subjected to the action of the work station.

Another object is to provide a succession of work stations including means for softening the web, means for impressing a plurality of trays or indentations in the web, means for loading product into the trays or indentations and finally sealing a cover on the filled trays and cutting the web both longitudinally and transversely to produce either single packages or a series which may, for example, include 100 medicinal tablets.

Another object is to produce a thermoforming work member in which an upper and lower platen are employed but in which only the lower platen carries a female die and the upper platen is adapted to provide quick-acting heat for softening the thermoplastic web and to pneumatically force the softened web into the female die.

Another object is to provide a work station having upper and lower platens and a quick-acting heater which is adapted to be heated outside of the work station and shuttled into place between the platens to impart heat to the web and then instantly shuttled outside the station to permit the platens to act on the softened web. By this means the machine may be operated at particularly high speed.

Other objects and advantages of this invention will be understood and appreciated by reference to the appended drawings and to the specification and claims.

In the drawings:

FIG. 1 is a top plan view of a machine embodying this invention which clearly shows the moving bed on which the several work stations are mounted.

FIG. 2 is a partially sectional perspective view of the web packages as they emerge from the machine and shows the longitudinal and transverse cutters for segregating the web into the individual packages.

FIG. 3 is a sectional elevation on the line 3—3 of FIG. 1 and clearly shows the work stations and their structure.

FIG. 4 is a view corresponding to FIG. 3 of the introductory end of the machine and should be understood as attached on the right-hand end of FIG. 3.

FIG. 5 is a partially sectional plan view taken on the line 5—5 of FIG. 3 and shows the eccentric means for moving the bed backward and forward with reference to the main frame.

FIG. 6 is a sectional elevation at right angles to FIG. 3 and taken on the line 6—6 thereof.

FIG. 7 is a sectional plan view on the line 7—7 of FIG. 6.

FIG. 8 is a sectional plan view on the line 8—8 of FIG. 6.

FIGS. 9 and 10 correspond to FIG. 8 but illustrate the structure with reference to the cam in different positions for a clearer understanding of the operation.

FIG. 11 is a partially sectional elevation taken on the line 11—11 of FIG. 10.

FIG. 12 illustrates in detail the shuttle heater shown in FIG. 3 in which the heating element for softening the thermoplastic web is adapted to be temporarily located between the upper and the lower platens of the work station, means being provided for quickly removing the heating elements from between the platens when the thermoplastic element is sufficiently softened, thereby permitting the upper and lower platens of the work station to come together and form the softened web.

Referring especially to FIGS. 1 to 5, inclusive, the machine as shown comprises a stationary frame indicated at 20, portions of which are shown in FIG. 1, a movable bed 21 which is mounted in a track 22 by a series of rollers 23, which are rotatably mounted on the movable bed 21. As clearly shown in FIG. 5, the front end of the movable bed 21 has a cross-bar 24 having a slot 25. A vertical pivot 26 is attached to the frame 20 and an eccentric arm 30, composed of two telescoping parts 31, 32, is mounted to rotate on pivot 26. At the outer end of 31 a roller 35 is mounted to fit into the slot 25 of the crossbar 24.

By reference to FIG. 3, the eccentric arm 30 is clearly shown together with parts 31, 32, the part 32 being moved inwardly or outwardly to elongate or shorten the effective length of the eccentric arm. When the length is determined and the adjustment made, a locking member 36 fastens (FIG. 3) the two parts of the eccentric arm 30 together and at the same time fastens the arm to the shaft 37, which is mounted to rotate in stationary bearings (not shown) supported by the frame 20. By adjusting the telescoping parts 31, 32 of eccentric arm 30, its effective length between pivot 26 and the center of the roller 35 may be made either shorter or longer, which will thus determine the length of stroke of the movement of the bed 21 when the eccentric arm 30 is rotated with the shaft 37 by any suitable motor (not shown).

Referring to FIG. 4, a spool of thermoplastic web 40 is mounted on pin 41 and constitutes the primary source of the web which is fed into the machine, as hereinafter explained. Another spool 42 mounted on pin 43 constitutes a secondary source of thermoplastic web, and when in the operation of the machine the web from spool 40 becomes nearly exhausted, the end of the secondary spool 42 is then arranged to overlap a substantial length of the web from spool 40, and a lever arm 45 is then thrown from the full line position of FIG. 4 into the broken line position so that an enlargement 46, which contains a Nichrome heater element 47 on the hub 48 of the lever 45, is forced into contact with the webs. A current is passed through the heater 47. The heat and pressure maintained is such as to unite the webs completing a splice between the primary and the secondary source, and at the same time projection 46 irons the web joint and flattens it to the extent that the thickness of the web at the weld is no greater than, and is in fact equal to, the thickness of the web prior to the weld.

A plurality of spools 50 which are mounted to rotate on a stationary shaft 51 constitute guide pulleys for narrow drive bands 52. As clearly shown in FIG. 5, the shaft 51 is mounted in the stationary frame 20 of the machine. Spools 50, of which four are shown in FIG. 5, are located near one end of the machine, and a similar group of spools 50 are located near the opposite end of the machine, as clearly shown in FIG. 3. Narrow steel bands 52 are mounted on the spools 50 and extend over corresponding spools 50 at the opposite end of the machine. They are continuous bands which are constantly moving forward during the operation of the machine and constitute a carrier for the thermoplastic web 60, which extends from spool 40 or spool 42 over guide cylinder 61 and thence over the bands 52, as clearly shown in FIG. 5.

Prior to its entry into this work station, the web is softened by the application of heat as it passes through a thermal tunnel 90, which is composed of a belt 91 mounted on rollers 92 and heated by electric heater 93. The rollers 92 are so placed that the lower half of the belt 91 contacts the web 60 and moves forward with it. The belt 91 is made of any suitable material which will permit it to retain heat and transfer it to the web 60. Then, the web progresses through a shuttle heater, as shown in detail in FIG. 12, toward the first work station.

The first work station 70 is composed of an upper platen 71 having a pressure insert 72 of porous material with a heater element 72a imbedded therein, as detailed in FIG. 12, and a lower platen 73 having a female die 75 mounted thereon with insert cavity 74. The upper platen 71 has a series of holes 76 which extend through the upper platen 71 and the pressure insert 72 and are adapted to be supplied with air on call signal under substantial pressure such as 50 to 60 pounds per square inch from any suitable source (not shown).

The lower platen has downwardly projecting racks 80 (see FIGS. 3 and 7) which cooperate with a double toothed rack 81 by means of gear wheels 82, 83. The gear wheel 82 is mounted on the work station frame to cooperate with one of the racks 80 on one side and with one side of the double rack 81 on the other. Gear wheel 83 is mounted to cooperate with the opposite rack 80 and the adjacent teeth of the double rack 81. The double rack 81 is attached to the cross-bar 84 to which the upper platen 71 is loosely attached by adjusting screw 85.

The details of this work station are the same as another work station shown specifically in FIG. 3 and will be described in greater detail in that connection.

The general arrangement is such that a cam 87 (FIG. 3), mounted on stationary frame 20 which cooperates with a cam roller 88 which is pivotally mounted at the bottom of the double rack 81 causes the double rack to move downwardly, and by reason of the stationary gear wheels 82, 83 mounted on the work station frame the rack extensions 80 move upwardly. In this way the upper platen 71, when the cam actuates the station, moves downwardly and the lower platen 73 moves upwardly closing the station so that the web 60 is tightly clamped between the upper and lower platens, and the air forced through the holes 76 pushes the web 60 into the female die 75.

The cam 87 is so placed that it will permit the platens to separate as the softened web from the thermal tunnel and the shuttle heater carrier 250 (FIG. 12) enters. Then the cam will actuate the station to close the upper and lower platens, and the pneumatic action of the compressed air entering through holes 76 will force the softened web into the female die, which gives it its definite and permanent shape.

While only one die is shown in FIG. 3, a plurality of dies or a single die with a plurality of openings may be used, as clearly shown in FIG. 1.

After the thermoplastic web is formed and air is vented from the die as hereinafter explained, the cam 87 is released and the station opens separating the upper and lower platens from each other, thus permitting the plastic web, including the trays formed therein by the die 75, to pass out from this station and permit it to move into the product loading station 100.

For purposes of illustration, a stack of products 101 is mounted above the thermoplastic web, and the products are delivered by gravity into the web trays when the parts are in the position shown in FIG. 3. The web with its loaded trays open at the top progresses to the cover sealing station 150. Prior to that station a cover web 151 is introduced over a cylinder 152, thus closing the top of the trays. The web 60 with its closed trays, including the cover web 151, then enters station 150, which is similar in many respects to station 70 and is composed of a lower platen 153 and upper platen 154, which is faced with a pressure insert 155 and heater element 72a. The lower platen 153 has a removable pressure insert 156 in which female die cavity 157 is disposed.

As clearly shown in FIG. 6, the upper platen 154 has a boss 158 which is located at the top of platen 154 and is central relative thereto. A screw 159 having a head 160 located loosely within a hollow in the boss 158 extends outwardly through a cross-bar 161 and has a knurled head 162.

The arrangement is such that the upper platen 154 is centrally and loosely supported by the screw 159 and is self-adjusting in making contact with the web packages when this station is closed. A pair of double racks 170, 171 are located one on each side of the webs and the platens. The cross-bar 161 is pivoted at 172 at the top of the rack 171 and is adapted to be locked to the rack 170 by a quick-break lock 175.

At the lower end of each of the racks 170, 171 are located pins 177, 178 which extend transversely through the racks 170, 171 and are fastened in position by set screws 179, 180. The inner ends of the pins have grooves 181, 182 to which helical springs 183, 184 are connected. The opposite ends of these springs are hooked into loops 185, 186 on the lower platen shown in FIG. 6. The outer ends of the pins 177, 178 have rollers 190, 191 rotatably mounted thereon. These rollers cooperate with cams as hereinafter described. The cam structure on each side of the cover sealing station is identical, and only one will be described in detail as follows:

A cam cage 195 is attached in two directions to the stationary frame 20 of the machine by machine screws 196, as shown in FIGS. 6 and 8. Referring to FIG. 8, cam 200 is mounted in a slot or recess 201 in the cage 195 and is connected by pins 202, 205 which project into slots 203, 304, the arrangement being such that a spring 210 which is mounted on a fixed pin 211 extends outwardly from the cage 195 as shown in FIG. 11. The other end of the spring 210 is connected to the pin 202.

The slots 203, 204 are parallel to each other, the arrangement being such that the cam 200 will occupy a position as shown in FIG. 8, where cam roller 190 is beyond cam 200 and has no actuating contact therewith. On the other hand, the cam 200 may be moved laterally on the stroke to the positions shown in FIG. 9. In FIG. 10 the cam 200 is in position to actuate cam roller 190 when the cover sealing station with the cam rollers 190, 191 advance with the moving bed, and passed under cam 200 and the station is actuated thereby.

When the cam rollers 190, 191 are actuated by the cams 200, the racks 170, 171 together with the platen 154 mounted thereon, are moved downwardly thereby causing the lower platen 153 to move upwardly and to close this cover sealing station, as shown in FIG. 6, thereby sealing the cover web 151 over the trays which are already filled with products and which fit into female die cavity 157 in the platen 153. It is thus apparent that the cover sealing web will be pressed onto the original web only at its ends and between the filled pockets where carrier bands 52 are located.

It will be understood that since the cam cages are bolted to the stationary frame, their position is also fixed and the actuation is effected by the movement of the cover sealing station which is mounted with bolts on the movable bed.

The thermoforming station 70, the product loading station 100 and the cover sealing station 150 are all mounted with bolts on the moving bed which, as already explained, is moved backward and forward on the frame 20 by the eccentric drive mechanism shown in detail in FIG. 5. Therefore, these stations are moved forward and back in keeping with the travel of the moving bed. At the same time the thermoplastic web 60 (FIG. 3) is carried forward continuously on the steel bands 52 by means of pawls attached by bolts or the like to the moving bed. Pawls 260 advance the bands 52 and the web on the forward movement of the bed, and pawls 261 advance the bands 52 on the rearward movement of the bed.

The arrangement and setting of the stations on the moving bed are such that each station is moving forward with the moving bed at exactly the same speed as the thermoplastic web when the station is actuated. Immediately after the station has been reopened, the driving pawls continue the motion of the web until a call signal is received by the scanner 270 which actuates a solenoid 271 which releases the pawls and provides for electronic register of the printed cover material with the tray.

FIG. 12, to which reference has already been made, shows in detail the heaters already described. The lower platen 73 has a female die 74 and is provided with a ventilating bottom plate 227 and a vent opening 228. The upper platen 70 has openings 76 for compressed air, and its upper and lower platens when open are separated to a sufficient extent to permit the shuttle heaters 235, 236 to be introduced, as explained below. The thermoplastic web 60 is located closely between the two electric shuttle heaters 235, 236. Each of these heaters has a Nichrome ribbon 240 which is protected by an outer insulating cover 241 and supplies heat to a porous nickel plate 242. Thermistor probes 243 are provided to determine the temperature existing in the plates 242. Air may be introduced at low pressure around the probes so as to distribute the heat through the porous nickel plate 242.

When the upper and lower platens 70, 73 are separated and the electric heater located between them, as shown in FIG. 12, heat is applied and the thermoplastic strip 60 is thereby softened. When this softening point is reached, the electric shuttle heaters 235, 236, which are mounted on carrier 250, is moved by a call signal entirely outside by the action of compressed air supplied through pipe 251 to a cylinder 252 behind piston 253 which has rod 254 fastened to arm 255 of the carrier 250.

This arrangement is adapted to be operated as a flying shuttle, which rides the plastic strip and as soon as the heater has sufficiently softened the thermoplastic web 60, the heater structure is removed, as above described, and the upper and lower platens 70 and 73 are forced into contact.

As hereinbefore described, the thermoplastic web 60 is subjected to the heating of the belt 91 of the thermal tunnel as it passes through the tunnel in contact with the belt, as clearly shown in FIG. 4. Web 60 then passes between the shuttle heater elements 235, 236, and finally in work station 70 the web 60 may be subjected to heat provided by electric heater 72a just before the work station 70 is actuated.

It should be understood that the amount of heat necessary to soften the web to the desired extent would depend on the thickness and composition of the thermoplastic web and the speed at which the machine operates. The amount of heat supplied by the thermal tunnel, by the shuttle heater and by the heater in the upper platen 71 of the work station may be adjusted to produce just the right condition of the plastic web when the work station 70 is actuated.

It may be found desirable in some cases to rely largely on the heater 72a of the platen 71, in which case the shuttle heater may be inactivated and the tunnel heater disconnected from its electrical supply source.

On the other hand, it may be desirable to disconnect the thermal tunnel and rely primarily on the shuttle heater with or without the action of the heater 72a in the platen 71.

By the use of the shuttle heater it is possible to run the machine at extremely high speed.

Instead of the square or rectangular trays illustrated in FIGS. 3 and 6, the female die may be formed with a large number of cup-shaped openings so that the plastic web may have formed therein a series of pockets which are adapted to receive a large number of medicinal tables or the like. The die may be arranged so that the small cup-shaped openings are formed in series or groups so that when the articles are sealed in place by the cover seal, the groups may be retained and separated from one another by the transverse and longitudinal cutters.

Numerous variations in the construction and arrangement of the herein described machine may be made by those skilled in the art without departing from the spirit of the invention, and only such limitations should be imposed as are indicated in the appended claims.

I claim:

1. A thermoforming structure comprising an upper platen, a pressure insert in the bottom of the upper platen, a lower platen, a female die attached to the lower platen and means for bringing the platens into and out of contact with each other, which consists of two downwardly projecting racks at one side of the lower platen and corresponding racks at the opposite side of the lower platen, a double rack projection on each side of the upper platen and extending between the said rack projections at one side and gear wheels, each meshing with one toothed section of the double rack and adjacent rack whereby a downward movement of the double rack will produce a downward movement of the upper platen and an upward movement of the single racks to raise the lower platen into contact with the upper platen.

2. A thermoforming structure comprising a lower platen, a female die mounted thereon, a pair of spaced toothed rack extensions fixed to the platen and extending downwardly therefrom at one side, a pair of toothed rack extensions fixed to the platen and extending downwardly therefrom at the opposite side, a pair of double toothed racks, one of which is disposed between each pair of rack extensions, pairs of gear wheels rotatably mounted one on either side of each central rack and meshing with the central rack and with the adjacent rack extension, and a cam for moving the central racks downwardly whereby the lower platen is moved upwardly.

3. A thermoforming structure comprising a frame having sides spaced in parallel relation to each other and a cross-bar hinged at the upper end of one side, a quick-break lock for holding the cross-bar securely closed, an upper platen and means for centrally and loosely supporting the upper platen from the cross-bar whereby the platen is self-adjusting and may be swung out of the box with the cross-bar when the lock is released.

4. The structure of claim 3 in which a lower platen is adapted to cooperate with the upper platen and a female die is mounted on the lower platen.

5. A thermoforming station which comprises two double racks, a top cross-bar hinged to one of the double racks at the top and fastened to the top of the other double rack by a quick-break lock, an upper platen centrally attached to and depending from the cross-bar, a lower platen mounted between the double racks below the upper platen and having four single rack projections, two of which extend downwardly on opposite sides of one of the double racks and the other two projections extend downwardly on the opposite sides of the other double rack, gear wheels each mounted to mesh with one of the four racks and with one side rack of the adjacent double rack, whereby an upward movement of the double racks raises the upper platen and simultaneously lowers the lower platen.

6. A thermoforming machine which comprises a stationary frame, a moving bed mounted to move longitudinally on the frame, means for producing a forward and backward movement of the bed, a source of thremoplastic web, an infeed belt adapted to apply heat to and soften the web, a thermoforming station mounted on the moving bed, a product loading station associated with the moving bed beyond the thermoforming station, a cover stock infeed station and a combined cover sealing and cutoff station beyond the product loading station, means for actuating the thermoforming station while the softened web is therein, and means for advancing the web through the product loading station and through the combined cover sealing and cutoff station.

7. A thermoforming machine comprising a stationary frame, a moving bed mounted to move longitudinally of the frame, means for producing a forward and backward movement of the bed, a thermoforming station associated with the bed, a product loading station mounted on the bed beyond the thermoforming station, a cover stock infeed station, a combined cover sealing and cutoff station, means for actuating the thermoforming station while it is moving with the moving bed and means for advancing the thermoplastic web through the stations at the same linear speed as the moving bed, whereby the stations have no movement relative to the thermoplastic web and the action takes place the same as if the stations were in a fixed position and the web was stationary when acted upon.

8. A thermoforming machine comprising a reciprocating bed, a plurality of work stations, including a thermoforming station, and a cover sealing station, mounted on the bed, means for advancing a thermoplastic web through the work stations at the speed of the moving bed, said means including means mounted on said reciprocating bed, and means for actuating the work stations while they and the web are moving at the same speed.

9. A thermoforming machine comprising a frame, a moving bed, a plurality of metallic bands mounted on spools on the frame for substantially continuous movement, a thermoforming station on the moving bed and means, mounted on said moving bed, cooperating with the metallic bands for advancing a thermoplastic web through the thermoforming station.

10. The structure of claim 9 in which pawls actuated by the moving bed advance the metallic bands substantially continuously.

11. A thermoforming structure comprising an upper platen and a lower platen, means for moving the platens toward or away from each other, at least one of the platens being centrally pivoted to provide an automatic contact between the platens, the upper platen being mounted on a cross-bar hinged at one end and having a quick break at the other, whereby the cross-bar and the upper platen may be swung outwardly for inspection or repairs.

References Cited
UNITED STATES PATENTS

| | | | |
|---|---|---|---|
| Re. 25,466 | 10/1963 | Koster | 53—184 XR |
| 2,712,717 | 7/1955 | Keller | 53—30 |
| 2,736,150 | 2/1956 | Loew | 53—30 XR |
| 2,879,635 | 3/1959 | Brock | 53—30 XR |
| 2,967,328 | 1/1961 | Shelby et al. | 18—19 |
| 3,222,971 | 12/1965 | Gerletz | 18—19 |
| 3,270,482 | 9/1966 | Kraut | 53—184 XR |
| 3,283,469 | 11/1966 | McBrady et al. | 53—184 XR |
| 3,318,066 | 5/1967 | Seragnoli | 53—53 |
| 3,343,336 | 9/1967 | Bradford | 53—184 X |

TRAVIS S. McGEHEE, *Primary Examiner.*

UNITED STATES PATENT OFFICE
CERTIFICATE OF CORRECTION

Patent No. 3,397,508                                              August 20, 1968

John H. Stroop

It is certified that error appears in the above identified patent and that said Letters Patent are hereby corrected as shown below:

Column 2, line 47, "fastens (Fig. 3)" should read -- (Fig. 3) fastens --. Column 4, line 53, "304" should read -- 204 --; line 62, before "stroke" insert -- return --; line 65, "passed" should read -- passes --. Column 6, line 17, "tables" should read -- tablets --.

Signed and sealed this 20th day of January 1970.

(SEAL)
Attest:

Edward M. Fletcher, Jr.                                WILLIAM E. SCHUYLER, JR.
Attesting Officer                                                  Commissioner of Patents